United States Patent
Korthäuer et al.

[19]

[11] Patent Number: 6,080,937
[45] Date of Patent: Jun. 27, 2000

[54] METHOD AND DEVICE FOR WEIGHING AND LABELING PACKAGES OF GOODS

[75] Inventors: Manfred Korthäuer, Mülheim, Germany; Guillaume Roberto de Miranda, Velden, Netherlands

[73] Assignee: Espera-Werke GmbH, Germany

[21] Appl. No.: 09/117,885

[22] PCT Filed: Aug. 8, 1997

[86] PCT No.: PCT/DE97/01684

§ 371 Date: Oct. 7, 1998

§ 102(e) Date: Oct. 7, 1998

[87] PCT Pub. No.: WO99/08079

PCT Pub. Date: Feb. 18, 1999

[51] Int. Cl.[7] .......................... G01G 23/38; G01G 13/04; G01G 19/00; G01G 21/10

[52] U.S. Cl. .................................. 177/2; 177/5; 177/121; 177/145; 177/184; 177/189

[58] Field of Search ..................................... 177/2, 3, 4, 5, 177/6, 7, 8, 9, 10, 11, 12, 13, 119, 120, 121, 145, 184, 185, 186, 187, 188, 189

[56] References Cited

U.S. PATENT DOCUMENTS

| | | |
|---|---|---|
| 3,955,665 | 5/1976 | Pettis, Jr. et al. ........................ 177/145 |
| 4,342,038 | 7/1982 | Lemelson ..................................... 177/2 |
| 4,392,535 | 7/1983 | Fujii et al. ............................... 177/145 |
| 4,683,707 | 8/1987 | Koyama ..................................... 53/502 |
| 4,817,026 | 3/1989 | Inoue et al. .............................. 177/185 |
| 5,178,228 | 1/1993 | Feinland et al. ......................... 177/185 |
| 5,230,391 | 7/1993 | Murata et al. ........................... 177/145 |
| 5,717,165 | 2/1998 | Cohen et al. ................................. 177/2 |

FOREIGN PATENT DOCUMENTS 19609431  9/1997  Germany .

*Primary Examiner*—Randy W. Gibson
*Attorney, Agent, or Firm*—Robert W. Becker & Associates

[57] ABSTRACT

A method and an apparatus for weighing and labeling packages of goods are provided. Each package is supplied to an electronic scale that is connected to an electronic analyzer that contains a computer. The load carrying mechanism of the scale is embodied as a conveyor belt, the speed of which is greater during supply and withdrawal than during a weighing process. Labeling of a package is effected on the conveyor belt after conclusion of the weighing process. Disruptions of the scale, caused by vibrations resulting from conveying and labeling packages, are eliminated on the one hand by a sufficiently high dead weight of the load carrying mechanism and on the other hand by a low-pass filter that is disposed in the electronic analyzer.

16 Claims, 3 Drawing Sheets

METHOD AND DEVICE FOR WEIGHING AND LABELING PACKAGES OF GOODS

BACKGROUND OF THE INVENTION

The invention relates to a method for weighing and labeling packages of goods according to which each package is supplied to an electronic scale that is connected to an electronic analyzer, which contains a computer, by means of which the weight of the package is determined and the associated price is calculated, whereby the package is conveyed further on the scale and after the weighing process it is supplied to a labeling system that is controlled by the computer for printing a label and applying the label to the package, whereafter the package is withdrawn as well as an apparatus for carrying out this method according to which the load carrying mechanism of the electronic scale is embodied as a conveyor belt, whereby the apparatus further includes a supply means and a withdrawal means for the packages as well as the labeling system that is controlled by the computer.

Methods and apparatus of this type are known. The known methods are carried out by means of relatively complicated apparatus and serve, for example, for weighing packaged goods arriving within a transport line or after a packaging machine, and for labeling the price. The known apparatus are therefore relatively expensive because in general a plurality of conveyor belts are required in order to separate the weighing process from the labeling process. Up to now this seemed necessary due to the fact that during labeling on the scale considerable problems arose. Due to the pressure loading of the scale that occurred during the labeling, especially when the labeling is to occur rapidly and correspondingly severe impacts act upon the scales, the scales undergo damage over time. Such damage can be manifested by a decrease in the precision of the scale or that when relieved of load it never fully returns to zero. Furthermore, the vibrations of the scale that result during the labeling have an aftereffect for a certain period of time. Since the scales must mechanically and electrically come to rest prior to the next weighing process, the number of weighings that can be carried out per minute are limited.

The object of the present invention is to develop a method and well as an apparatus of the aforementioned type in such a way that with a very compact, economical and technically uncomplicated construction of the apparatus, the weighing process can be carried out rapidly and with the required precision.

SUMMARY OF THE INVENTION

The realization of this object takes place according to the method in that at least during the weighing process the package is conveyed forward on the scale at a speed that is less than the supply speed and the withdrawal speed, and in that the application of the label, after termination of the weighing process, is effected on the scale itself, whereby disruptions of the scale, caused by vibrations resulting from the conveying and labeling of the package, are eliminated on the one hand by a sufficiently high dead weight between scale and package and on the other hand by a low-pass filter that is disposed in the analyzer and according to the apparatus in that the labeling system is disposed in the vicinity of the conveyor belt such that application of a label on a package is effected during forward conveying of the package on the conveyor belt, wherein the load carrying mechanism, which includes the conveyor belt, has a dead weight that is greater than the maximum weight of the packages that are to be weighed, and wherein at least one low-pass filter is disposed in the electronic analyzer, the low-pass filter having a threshhold frequency below 5 Hz.

Advantageous further developments of the invention are described in the dependent claims.

The invention proceeds from the basic idea that it is quite possible to carry out labeling on the scale itself if special measures are under-taken to ensure that the weighing process can progress in an undisturbed manner and the vibrations of the labeling process are mechanically and electrically dampened in such a way that after the weighing and labeling the scale is again returned to the state of rest in a sufficiently short period of ti me so that the next package of goods can be processed.

As described in detail subsequently with the aid of one specific embodiment, these special measures include on the one hand a variable control of the conveyor belt speed, which ensures that the package is rapidly supplied and withdrawn but during the weighing process and possibly during the labeling process is transported slowly. In this connection, in a particularly advantageous manner, the entire handling process can be tightened by already prior to the weighing process printing the label that is to be applied with the data that is independent of weight and only after conclusion of the weighing process printing the label with the data that is dependent upon the weight.

To dampen and suppress the vibrations that are triggered by the labeling process, mechanical means serve on the one hand to provide the load carrying mechanism, in other words the weighing scale, with a sufficiently high dead weight by means of which the vibrations are partially taken up, and on the other hand electrical means are provided in the form of a low-pass filter in the electronic analyzer, the limiting or threshhold frequency of which is fixed so low that all disruptions resulting from vibrations of the scale caused by the transport and the labeling process are suppressed and minimized.

With the inventive method and inventive apparatus, it is possible with little technical expenditure and complication, by means of a single conveyor belt, to weigh and to label packaged goods as they pass through.

BRIEF DESCRIPTION OF THE DRAWINGS

One exemplary embodiment for the inventive method and the inventive apparatus will be described in detail subsequently with the aid of the accompanying drawings.

In the drawings.

DESCRIPTION OF PREFERRED EMBODIMENTS

Figure 1:
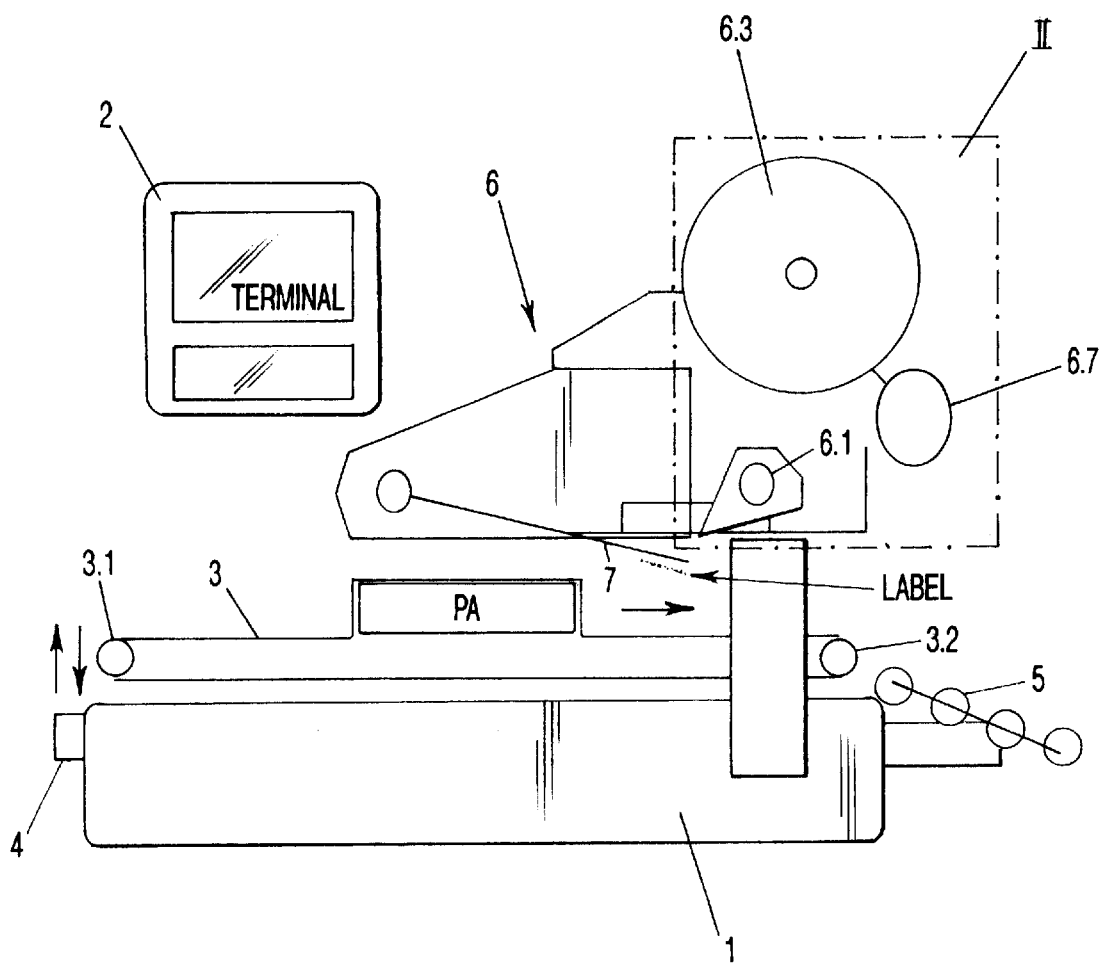
FIG. 1 shows a very schematic illustration of an apparatus for weighing and labeling packaged goods.
Figure 3:
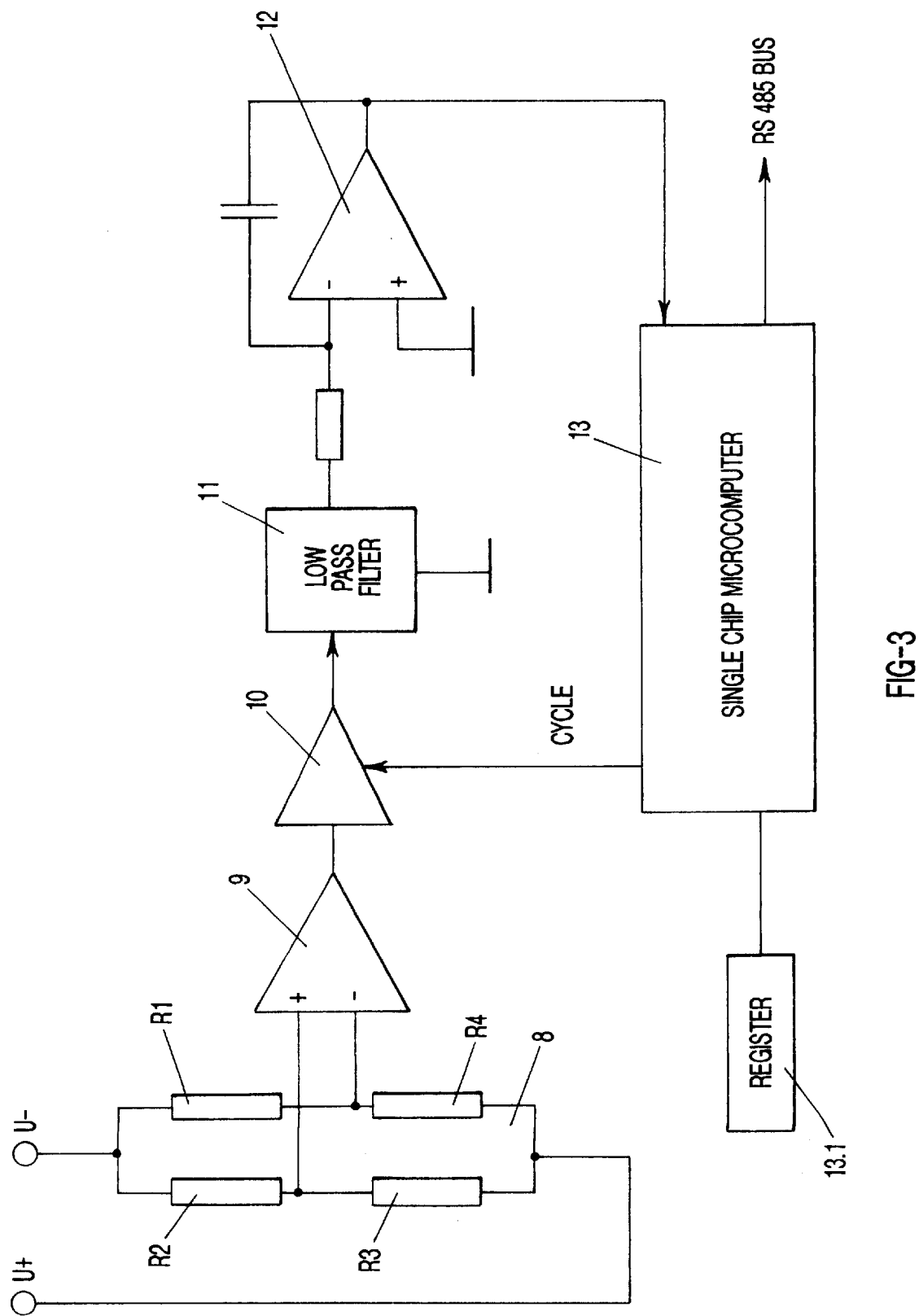
FIG. 3 is a very schematic block diagram of the electronic analyzer of the apparatus of the FIGS. 1 and 2.

FIG. 1 shows an apparatus for weighing and labeling packaged goods and includes an electronic scale 1 that is associated with an electronic analyzer that is illustrated in FIG. 3 and will be described in detail subsequently. The analyzer includes a computer that is not shown in detail in FIG. 1 and can be controlled from a terminal 2.

The load-carrying mechanism, in other words the weighing scale of the scale 1, is embodied as the conveyor belt 3, to which packages of goods PA, of which one is illustrated as being disposed on the conveyor belt 3, are introduced at the front end 3.1 by means of a non-illustrated feed mechanism or by hand. Disposed at the front end 3.1 of the conveyor belt 3 is a sensor, for example a photo-electric barrier 4, by means of which the time of contact or receipt, as well as the size of a package (by sensing the front and rear edges) are detected. The values detected by the photoelectric barrier 4 are conveyed to the computer 13 of the electronic analyzer in a manner not separately illustrated, and are processed there. The weighed and labeled packages are withdrawn at the rear end 3.2 of the conveyor belt 3 by means of a gravity roller conveyor 5.

Installed above the scale 1 in the region of the conveyor belt 3 is a labeling system 6 of known construction (FIG. 1 and 2) whereby from a label drum 6.3 a carrier band 6.2, with labels deposited thereon, is conveyed via various guide rollers to a printing mechanism 6.1. The printing mechanism 6.1, as is the case with the entire labeling system, is controlled in a known and not separately illustrated manner by the computer 13 of the electronic analyzer.

Figure 2:
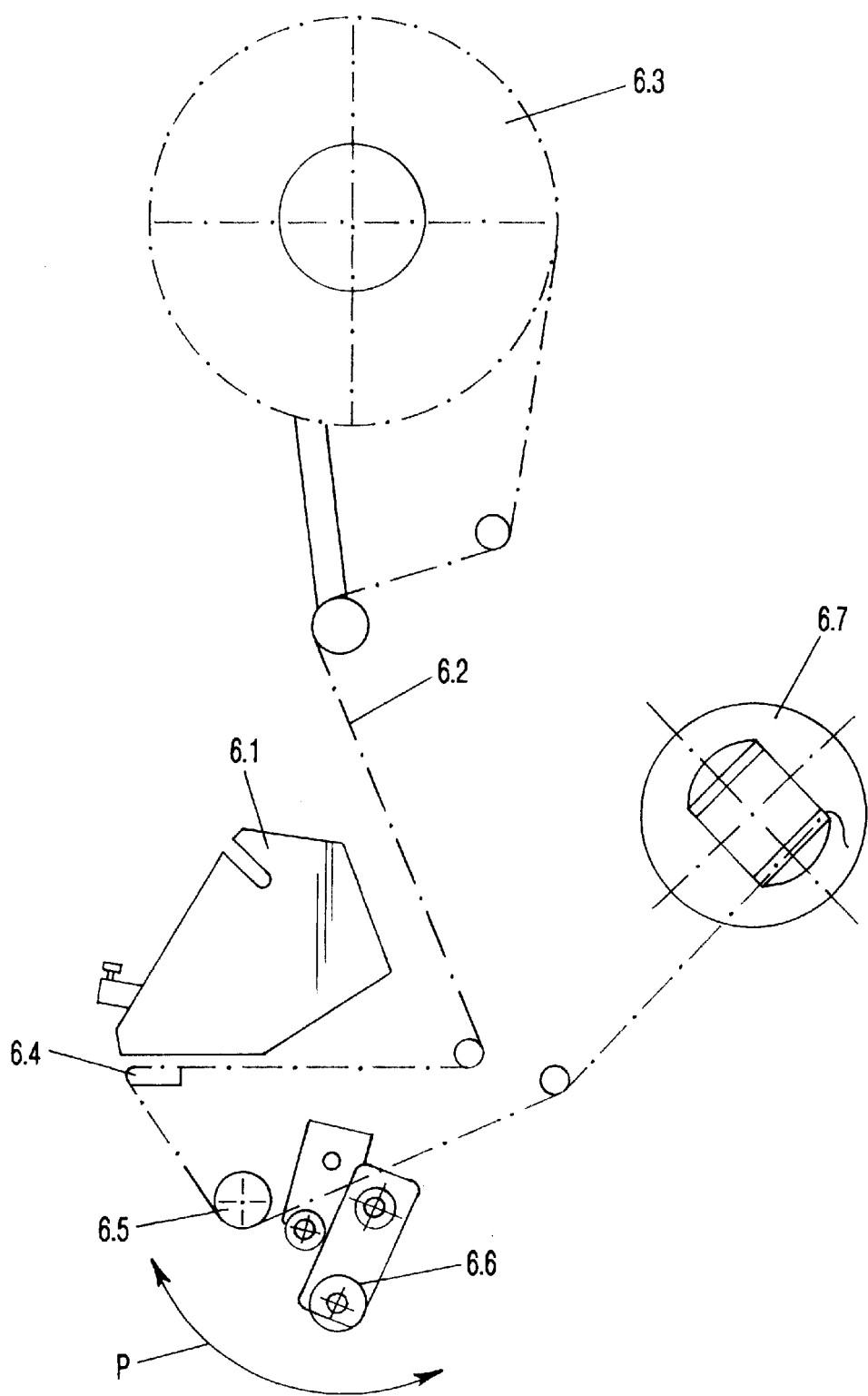
FIG. 2 again shows a schematic illustration, which is enlarged relative to FIG. 1, of the region 11 (indicated by dot-dash lines) in FIG. 1 of the apparatus.

The labels are disposed on the inner side of the carrier band 6.2 that is unwound from the label drum 6.3. After passing through the printing mechanism 6.1, the carrier band passes downwardly over a sharp edge 6.4. Prior to this location, the labels are disposed on the upper side of the carrier band and as a result of being guided over the sharp edge 6.4 are separated and supplied to the underside of a labeling arm 7 illustrated in FIG. 1, where they are held securely in place in a known and not separately illustrated manner by vacuum. For the labeling, the labeling arm 7 pivots downwardly in order to apply the label to the package that is then disposed at a prescribed location. After passing about the sharp edge 6.4, the carrier band 6.2 is conveyed via a drive roller 6.5 to a winding mechanism 6.7. The drive is effected by means of a pivotable feed or pressure roller 6.6. The direction of pivot is indicated in FIG. 2 by the arrow P.

In a manner known per se, the measuring device of the scale 1 is a DMS (resistance strain gauge) measuring segment 8 that is installed in a non-illustrated parallel control system in order to be able to change all forces that act upon the weighing scale into the vertical direction. The DMS measuring segment 8 is provided with four identical resistors R1, R2, R3 and R4, which are disposed on a substrate in a square-wave or meander-like fashion. When the resistors are extended or stretched, their electrical resistance value increases, whereas a compression reduces the resistance value. As can be seen from FIG. 3, the four resistors R1 to R4 are disposed in a bridged circuit that is connected to a power source U+/U−. The bridge is balanced when no forces are exerted upon the scale, in other words, when the scale is empty. The relatively small bridge voltage that results when the scale is weighted is conveyed to a differential amplifier 9 and from there to a sample and hold device 10, the operating cycle of which is prescribed by the computer 13. The sample and hold device 10 effects a timed discrete scanning or data collection of the measured values. The measured values that are obtained pass through a low-pass filter 11 that has a cut-off or threshhold frequency of 3 Hz in order to suppress disruptions and noise. The integrator 12 that follows the low-pass filter 11 effects a further low-pass filtering of the obtained measured signal, which is then conveyed to the computer 13 for further processing. Associated with the computer 13 is a register 13.1. Signals generated by the computer 13 are conveyed further via a line RS 485 Bus.

The weighing and labeling process described subsequently is carried out with the apparatus illustrated in FIGS. 1 to 3.

The packaged goods are supplied to the front end 3.1 of the conveyor belt 3 through the photoelectric barrier 4, by means of which the time of receipt and the size of the package are detected. During the supply, the conveyor belt 3 runs at a high rate of speed of about 40–60 m/s. During the receipt of the package, and controlled by the computer, the data that is independent of the weight is already printed upon a label that has entered the printing mechanism 6.1. After the package has left the photoelectric barrier 4, it rests completely upon the conveyor belt 3 and hence upon the scale 1. The speed of the conveyor belt 3 is then reduced to about 10–20 m/s and the weighing process begins. The optimum speeds of the conveyor belt depend upon the size of the package and upon the selected labeling site upon the package. With a relatively long package a higher feed velocity and withdrawal are selected, so that the time for the feed and withdrawal, during which no weighing can take place, is reduced. The transport speed during the weighing is, in contrast, low for a long package since the package could otherwise reach the labeling site before the label is printed. A better intermediate speed is selected if the label is to be applied to the end of a long package. To better utilize the scale, it is furthermore advantageous if the withdrawal of the labeled package is carried out simultaneously with supply of the next package. The scale is then continuously weighted and finds the weight of the next package more quickly, because it is not completely relieved of a load. This considerably reduces the transient effect of the scale. While the package is being conveyed slowly, the scale determines the weight and the computer 13 calculates from the weight and the stored base price the price of the package. After conclusion of the weighing process, this price, controlled by the computer, is again printed upon the label by the printing mechanism 6.1.

In processing the signals given off by the photoelectric barrier 4, utilizing the known speeds of the conveyor belt, the computer 13 previously calculates at what point in time and what location of the conveyor belt the label is applied upon the package by means of the labeling arm 7. This then takes place by pivoting the labeling arm 7 after conclusion of the weighing process. The weighing process itself is effected in conformity with the data collection by means of the sample and hold device 10 with several measured values, which are compared with one another in the analyzer. Thus, faulty measured values that lie beyond a prescribed range of deviations can be eliminated.

The pulse exerted upon the scale as a result of the application of the label is initially taken up by the dead weight of the load carrying apparatus of the scale 1 that contains the conveyor belt 3. This dead weight, can, for example, be 40% to 70% or advantageously 50% to 60% of the maximum weighting of the scale. Thus, for example, in one practical specific embodiment, at a maximum package weight of 3 kg and a permissible overall maximum weight of 15 kg, the weight of the weighing scale can be about 8.5 kg. The dead weight of the load carrying system of the scale 1 already effects a dampening of the vibration exerted upon the scale due to the labeling process. In addition, the electrical pulses generated upon the scale due to the residual brief pressure, as well as the pulses generated during the transport, are filtered in the electrical analyzer by the low-pass filter 11 and the filtering effect of the integrator 12. This filtration is of particular significance, since all vibrations exerted upon the scale have an aftereffect for a certain period of time and these aftereffects must be suppressed before the next weighing process can begin. This suppression time of course limits the throughput of successive packages. In order to be able to undertake a weighing process approximately each 0.5 seconds, it has been shown to be expedient to design the filter with a threshhold frequency of 3 Hz. This ensures that the system returns to a zero or neutral position quickly enough.

Due to the movement of the motor and the drive belt, the conveyor belt 3 experiences a certain amount of unrest, which is manifested in spurious signals. The spectrum of these spurious signals is a function of the speed of the conveyor belt. The spurious signals of the conveyor belt are detected by the measuring segment 8 of the scale and lead to an error in weighing. The low-pass filter 11 must filter out these errors. At a limiting frequency of 3 Hz, it is possible to allow the conveyor belt to run slowly and the spurious singles can be filtered out. If the threshhold frequency of the filter is increased, the minimum speed of the conveyor belt must also be increased, since otherwise the scale can determine no valid weight value because low frequency disruptions due to slow conveyor belt speeds would falsify the weighing. However, it has been shown that especially with long packages of goods the transport speed must not be too great during the weighing. Reducing the threshhold frequency still further would in contrast lead to a slowing down of the weighing process due to the filter, since the so-called group delay of the filter increases and the weighing result arrives at the computer 13 later in time. A digital filter within the computer enables the taking of an average of the measured values and a subsequent assessment of whether the measured weight still changes or not. When two successive measured values do not exceed a prescribed weight differential, the weight is deemed to be stable.

The speed of the conveyor belt 3 is set in conformity with existing conditions. Although a high speed would be advantageous because then all disruptions that occur would be in the high frequency range, it must not be too great because then too little time would be available to carry out the various procedures. It must not also be too low because then very low frequency vibrations can occur that cannot be filtered out. It has been shown, as previously mentioned, that it is expedient to operate with conveyor belt speeds that during the weighing process, and possibly the labeling process, are at about 10–20 m/s and during receipt and withdrawal of the package are at about 40–60 m/s.

It has furthermore been shown to be advantageous if disruptions and vibrations of the scale are detected and when prescribed limiting values are exceeded, to reduce the feed velocity, at least during a portion of the weighing process, and in particular possibly to a value of zero. An appropriate reduction of the conveying velocity can be carried out if a package exceeds a prescribed maximum weight. The weighing is then concluded, possibly with the conveyor belt at a standstill. In this way, a prescribed position of the label on the package can always be maintained, and every package that runs through is weighed and labeled. This avoids the drawback encountered by a system that has a continuous operation that a package can pass through without being labeled because the scale could not satisfactorily determine the weight.

After being labeled, the package is withdrawn via the gravity roller conveyor 5.

The specification incorporates by reference the disclosure of German priority document PCT/DE97/01684 of Aug. 8, 1997.

The present invention is, of course, in no way restricted to the specific disclosure of the specification and drawings, but also encompasses any modifications within the scope of the appended claims.

What is claimed is:

1. A method of weighing and labeling packages of goods, including the steps of:

supplying each package to an electronic scale that is connected to an electronic analyzer that contains a computer, whereby the weight of the package is determined and the associated price is calculated;

conveying said package further on said scale via a conveyor belt thereof during a weighing process, whereby at least during the weighing process said conveyor belt is conveyed forward at a speed ranging from about 10–20 m/s and during a supply and a withdrawal process is conveyed at a speed ranging from about 40–60 ms;

after the weighing process supplying said package to a labeling system that is controlled by said computer for the printing of a label and the application of said label to said package, wherein said application of said label, after termination of the weighing process, is effected on said scale itself;

eliminating disruptions of said scale, caused by vibrations resulting from conveying and labeling said package, by a dead weight of a load-carrying mechanism of said scale, which includes said conveyor belt, wherein said dead weight is greater than a maximum weight of packages to be weighed, and by a low-pass filter disposed in said analyzer, wherein said low-pass filter has a threshold frequency below 5 Hz; and withdrawing said package from said conveyor belt.

2. A method according to claim 1, which includes the steps of printing said label with data that is independent of weight prior to the start of the weighing process and printing the label with data that is dependent upon weight after termination of the weighing process.

3. A method according to claim 2, which includes the steps of detecting a time of receipt by said scale of said package and the size of said package in a sensor controlled manner, from these values and a prescribed conveying speed on said scale determining a point in time of labeling by said computer, and correspondingly controlling said labeling system.

4. A method according to claim 3, which includes the steps of carrying out the weighing process such that in short time intervals a plurality of successive measured values are taken, and forming an average value from these measured values.

5. A method according to claim 4, which includes the steps of comparing the measured values of a given weighing process with one another, and eliminating measured values that are disrupted by vibrations of said scale and lie beyond a prescribed range of deviations.

6. A method according to claim 1, which includes the steps of detecting disruptions and vibrations of said scale, and when prescribed threshold values are exceeded reducing the conveying speed to zero at least during a portion of the weighing process.

7. A method according to claim 1, which includes the step, when a prescribed maximum weight of a package of goods is exceeded, of reducing the conveying speed to zero at least during a portion of the weighing process.

8. A method according to claim 1, which includes the step of effecting supply of a package of goods that is to be weighed essentially simultaneously with the withdrawal of the preceding package of goods.

9. An apparatus for weighing and labeling packages of goods, comprising:

an electronic scale that is connected to an electronic analyzer that contains a computer, whereby said scale is provided with a load carrying mechanism in the form of a conveyor belt;

means for supplying packages to said conveyor belt of said scale;

a labeling system that is controlled by said computer, wherein said labeling system is disposed in the vicinity of said conveyor belt such that application of a label to a package is effected during forward conveying of said package while said package is still on said scale, and wherein said load carrying mechanism, which includes said conveyor belt, has a dead weight that is greater than a maximum weight of a package that is to be weighed;

at least one low-pass filter disposed in said electronic analyzer, said at least one low-pass filter having a threshhold frequency below 5 Hz;

means for withdrawing packages from said scale; and means for driving said conveyor belt during a weighing process at a speed ranging from about 10–20 m/s and during a supply process and a withdrawal process at a speed ranging from about 40–60 m/s.

10. An apparatus according to claim 9, which includes, at a front end of said conveyor belt, a sensor, which is connected to said computer, for detecting a time of receipt and the size of a package, and for controlling the speed of said conveyor belt and/or for calculating a point in time of labeling and control of said labeling system.

11. An apparatus according to claim 9, wherein said dead weight of said load carrying mechanism is 40% to 70% of a maximum load of said scale.

12. An apparatus according to claim 11, wherein said dead weight of said load carrying mechanism is 50% to 60% of said maximum load of said scale.

13. An apparatus according to claim 9, wherein at least one of said at least one low-pass filters has a threshhold frequency of at most 3 Hz.

14. An apparatus according to claim 10, wherein said electronic analyzer includes a bridge circuit that is connected to said computer by means of a circuit branch that includes a differential amplifier, a sample and hold device and integrator, and wherein a low-pass filter is disposed in said circuit branch.

15. An apparatus according to claim 14, wherein said low-pass filter is disposed between said sample and hold device and said integrator.

16. An apparatus according to claim 9, which includes means for effecting an additional low-pass filtration in the digital range of said analyzer.

* * * * *